United States Patent [19]

Förster et al.

[11] 4,270,558
[45] Jun. 2, 1981

[54] PROCESS FOR MONITORING THE FLOW OF FINE GRAINED SOLID FUEL FOR USE IN GASIFIERS

[75] Inventors: Manfred Förster; Adolf Linke, both of Essen; Ulrich Geidies, Waltrop, all of Fed. Rep. of Germany

[73] Assignee: Krupp-Koppers GmbH, Essen, Fed. Rep. of Germany

[21] Appl. No.: 970,124

[22] Filed: Dec. 11, 1978

[30] Foreign Application Priority Data

Dec. 21, 1977 [DE] Fed. Rep. of Germany ....... 2757032

[51] Int. Cl.³ .......................... F17D 3/00; G01F 1/00
[52] U.S. Cl. ..................................... 137/2; 137/486; 137/487.5; 73/861.02; 73/861.04; 250/356; 250/435
[58] Field of Search ............... 250/432 R, 358 R, 356, 250/359, 435; 73/194 M; 137/2, 486, 487.5

[56] References Cited

U.S. PATENT DOCUMENTS

| | | | |
|---|---|---|---|
| 3,280,328 | 10/1966 | Gieskieng | 250/359 |
| 3,291,981 | 12/1966 | Stock | 250/356 |
| 3,431,415 | 3/1969 | Stone et al. | 250/358 R |
| 4,096,745 | 6/1978 | Rivkin et al. | 73/194 M |
| 4,182,957 | 1/1980 | Forster et al. | 250/356 |

FOREIGN PATENT DOCUMENTS 966987  8/1964  United Kingdom .................. 73/194 M Primary Examiner—Alfred E. Smith
Assistant Examiner—Carolyn E. Fields
Attorney, Agent, or Firm—Michael J. Striker

[57] ABSTRACT

A pneumatic or electrical signal indicating the flow mass of a fine-grained fuel suspended in a carrier gas is produced by computer means. The input for the computer is constituted by the quantity determined for the volume of the carrier gas and the quantity determined for the density of the carrier gas together with the quantity determined as the specific weight of the fuel and the quantity determined by a radiometric measurement of the total density of the fuel and carrier gas flow. The computer is programmed to produce the above signal on the basis of a mathematical relationship defined in the above text. A valve controlling the feed of fuel into a gasifier is operated by the signal produced by the computer.

3 Claims, 2 Drawing Figures

PROCESS FOR MONITORING THE FLOW OF FINE GRAINED SOLID FUEL FOR USE IN GASIFIERS

BACKGROUND OF THE INVENTION

In an earlier application (Ser. No. 829,814), now U.S. Pat. No. 4,182,957, a process has been disclosed for determining the flow of fine grained or dust-like solid fuels into a gasifier such as is used in a partial oxidation process. The fuel in these cases is suspended in a gaseous or vaporous medium and is measured immediately prior to entry into the gasifier by means of a radiometric density measurement.

The earlier application related in particular to that case where the fuel was suspended in oxygen or air or an oxygen-enriched air and water vapor. The quantities found for the flow volume of the gaseous or vaporous reaction media and the quantity determined in the radiometric density measurement of the fuel flow relating to the total density of the flow were fed into a computer in which a signal indicating or controlling the volume flow for the fuel input was produced according to a specific mathematical relationship. In this process the flow volume of the fuel such as coal was considered negligible and was not utilized in the computer during the signal production process.

It has, however, now been found in actual use that this neglect was only justified if the gaseous or vaporous medium was loaded with the fine grained or dust-like fuel up to a limit of about 2 kg of fuel/m$^3$ of gas. It has been found, on the other hand, that this amount is exceeded in many cases, such as where the gasifier is operated at an elevated pressure. The load amounts may then actually have a magnitude equal to or greater than 300 kg of fuel/m$^3$ of gas. In these cases it is no longer possible to disregard the flow volume of the fuel. This flow volume must then be considered in the computer calculations.

In addition, and contrary to the general embodiment described in the prior application, the fuel is frequently suspended in an inert carrier gas (preferably nitrogen), and not in the gaseous or vaporous reaction media constituted by oxygen or air and water vapor.

It is therefore an object of the present invention to provide for an improvement of the previously disclosed process which also takes into consideration the flow volume of the fuel in the input to the computer and where the fuel also may be suspended in an inert carrier gas, preferably nitrogen.

SUMMARY OF THE INVENTION

This object is achieved by passing the carrier gas through means for (a) measuring its flow volume ($V_{N2}$) and (b) its density ($\rho_{N2}$) and feeding the resulting quantities together with a measurement of (c) the specific weight of the fuel ($\rho_K$) and the radiometric measurement of (d) the total density of the flowing fuel and carrier gas ($\rho_{tot}$) into a computer which will produce from the above input an electrical signal indicating or controlling the flowing mass of the fuel input ($M_K$) on the basis of the following mathematical relationship:

$$M_K = V_{N2} \cdot \rho_K (\rho_{N2} - \rho_{tot})/(\rho_{tot} - \rho_K)$$

In these formulae the symbols have the following meaning

M tot = total flowing mass
$M_K$ = flowing mass of the fuel
$M_{N2}$ = flowing mass of the carrier gas
$\rho_{tot}$ = total density
$\rho_K$ = density (specific weight) of the fuel
$\rho_{N2}$ = density of the carrier gas
V tot = total flow volume
$V_K$ = flow volume of the fuel
$V_{N2}$ = flow volume of the carrier gas $$\rho_{tot} = \frac{M \text{ tot}}{V \text{ tot}} = \frac{M_K + M_{N2}}{V_K + V_{N2}} = \frac{M_K + M_{N2}}{\frac{M_K}{\rho_K} + V_{N2}}$$

$$\rho_{tot} = \left( \frac{M_K}{\rho_K} + V_{N2} \right) = M_K + M_{N2}$$

$$M_K \cdot \frac{\rho_{tot}}{\rho_K} + V_{N2} \rho_{tot} = M_K + M_{N2}$$

$$M_K \cdot \frac{\rho_{tot}}{\rho_K} - M_K = M_{N2} - V_{N2} \cdot \rho_{tot}$$

$$M_K \cdot \left( \frac{\rho_{tot}}{\rho_K} - 1 \right) = M_{N2} - V_{N2} \cdot \rho_{tot}$$

$$M_K \left( \frac{\rho_{tot} - \rho_K}{\rho_K} \right) = M_{N2} - V_{N2} \cdot \rho_{tot}$$

$$M_K = \frac{M_{N2} - V_{N2} \cdot \rho_{tot}}{\rho_{tot} - \rho_K} \cdot \rho_K$$

$$M_K = \rho_K \frac{V_{N2}(\rho_{N2} - \rho_{tot})}{\rho_{tot} - \rho_K}$$

$$M_K = V_{N2} \cdot \rho_K \frac{\rho_{N2} - \rho_{tot}}{\rho_{tot} - \rho_K}$$

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
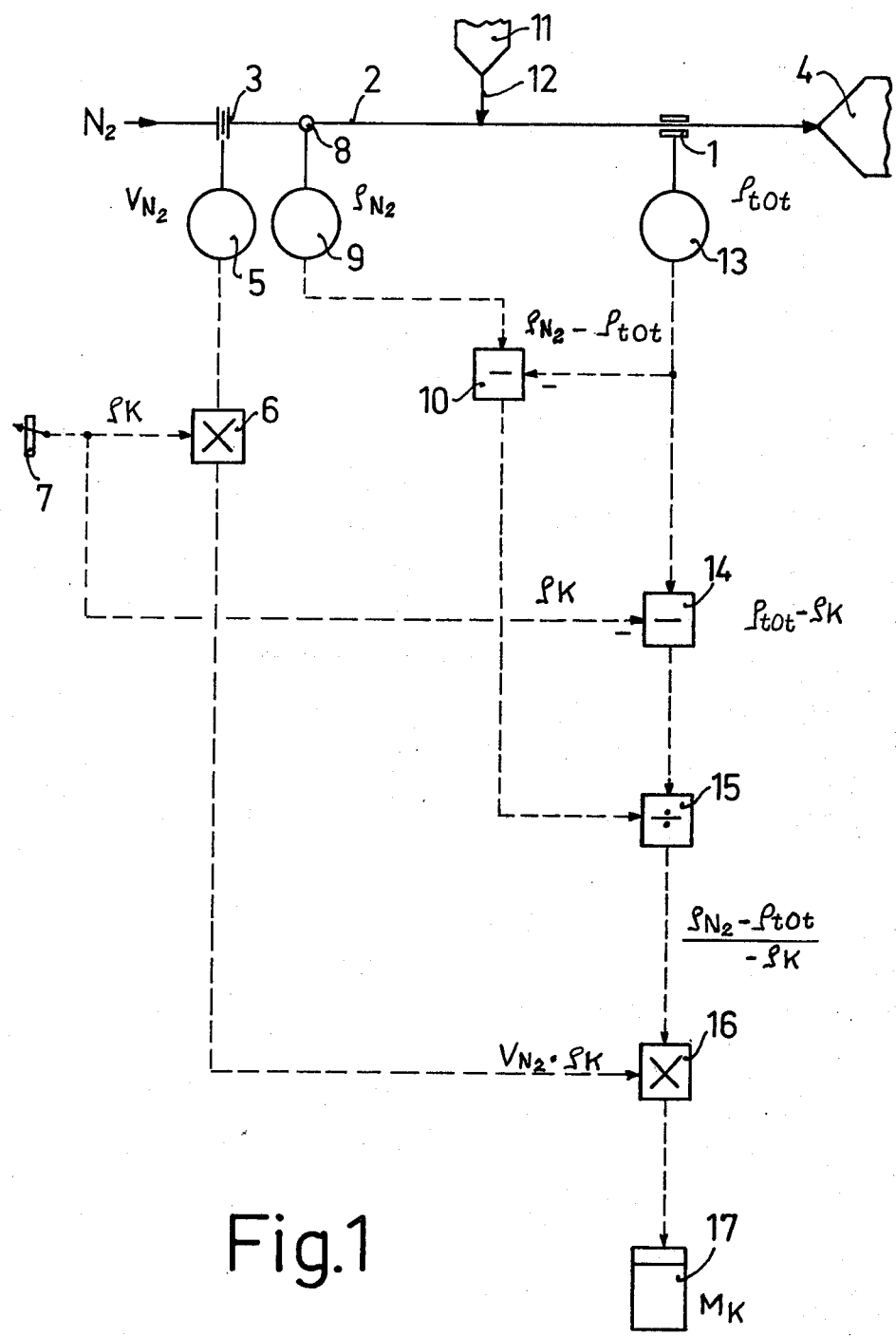
FIG. 1 is a current diagram for the process of the invention.

With reference to the circuit diagram of FIG. 1 it will be seen that the device 1 for the radiometric density measurement is arranged at both sides of the inlet conduit 2 for the fuel-carrier gas mixture immediately prior to the entry of the mixture into the gasifier 4.

Regarding the operation of the radiometric density measuring device, reference is made to the discussion in the above-noted earlier U.S. application and to the publication there cited in "Elektroanzeiger", 1974, No. 7, pages 132-134. The fine-grained or dust-like fuel is passed from the supply tank 11 via a duct 12 into the carrier gas which is received through the conduit 2.

Preferably, the carrier gas is nitrogen. However, other carrier gases may also be used.

According to the present invention the carrier gas is first passed through a measuring orifice 3 where the flow volume $V_{N2}$ is determined on the basis of the pressure differential principle. The resulting measurement is then transmitted via the converter 5 into the computer 6. The converter 5 converts the differential pressure formed in the measuring orifice 3 in accordance with the measuring range into an equivalent pneumatic or electrical signal which represents the quantity identified as $V_{N2}$. This quantity $V_{N2}$ is then multiplied in the computer $\int 7$ the specific weight of the fuel $\rho_K$. This specific weight is separately determined and in case of identical fuel composition remains constant for extended periods of time. The introduction of this quantity $\rho_K$ into the computer is then effected by a manually adjustable rotary factor dial 7 which is provided with a density scale and permits the device to be set with the specific value of $\rho_K$. The factor dial 7 likewise generates a corresponding pneumatic or electrical signal which is used in the computer 6 and represents the quantity $\rho_K$.

The carrier gas flowing through the conduit 2 is then subjected to a density measurement in measuring device 8. Via the measurement converter 9 the obtained quantity $\rho_{N2}$ is fed into the computer 10. The measurement of the gas density is carried out in conventional form, for instance by means of a gas density scale or a centrifugal blower. The converter 9 again has the purpose of converting the measurement obtained from the measuring device 8 into a corresponding pneumatic or electrical signal which, in the computer 10, constitutes the quantity identified as $\rho_{N2}$.

The radiometric density measurement effected in the device 1 which furnishes the value for the total density $\rho_{tot}$ is simultaneously fed into the input of the computer 10 via the measurement converter 13. In the computer the difference $\rho_{N2} - \rho_{tot}$ is calculated.

The quantity obtained for $\rho_{tot}$ is also transmitted into the computer 14. In addition the amount of the specific weight of the fuel $\rho_K$ is fed into the computer and the difference $\rho_{tot} - \rho_K$ is calculated.

The results obtained in the computers 10 and 14 are then fed into the computer 15 in which the quotient $(\rho_{N2} - \rho_{tot})/(\rho_{tot} - \rho_K)$ is calculated. This quotient is then subsequently multiplied in the computer 16 with the quantity $V_{N2} \cdot \rho_K$ received from the computer 6. Thus, in accordance with the above-stated mathematical formula the quantity $M_K$ for the flow mass of the fuel is obtained.

As further explained in the above-noted earlier U.S. application, this last quantity is then transmitted to the control device 17 which controls the safety lock of the gasifier 4.

It will be understood that in lieu of the individual computer 6, 10, 14, 15 and 16 a single computer of conventional form may be used in which the individual computer operations are carried out as programmed. It will furthermore be understood that in the same manner as in the earlier patent application the use of the described method is not limited to the partial oxidation of fuel. It can, of course, also be used where similar conditions exist regarding the input of fuel into a reaction space as are present in case of the partial oxidation. An example would be the preheating of coal for a coking plant or the coal injection into a blast furnace.

Figure 2:
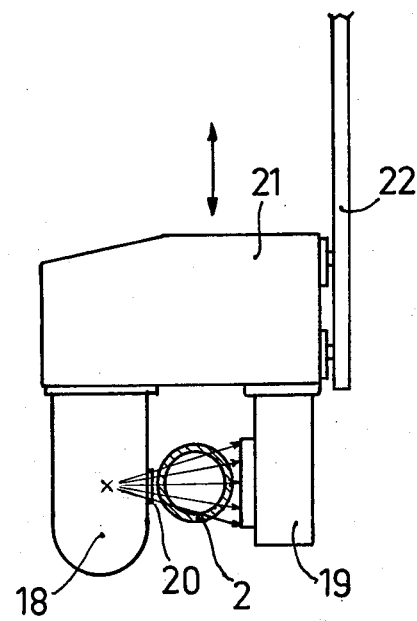
FIG. 2 is an apparatus for carrying out the radiometric density measurement.

FIG. 2 of the drawings illustrates a device for the radiometric density measurement which can be used in the process of the invention and can also be used in the process described in the earlier application.

The device includes a receptacle 18 in which a source of radiation is placed and a detector or radiation measuring device 19 which is also housed in a similar receptacle. Between the two receptacles there is provided the conduit 2 through which the material to be measured passes (which in this case is the fuel suspended in the carrier gas).

Receptacle 18 for the radiation source may contain radioactive material, such as strontium 90. The radiation passing through the window 20 (as indicated by the arrows) is then transmitted through the material in the duct 2 and is received in the detector receptacle 19 where an ionization chamber may be located.

The receptacle 18 and the detector receptacle 19 are carried by a bracket 21 which is adapted for height adjustment on a vertical rolling track 22.

The device, however, may also be formed in another manner by supporting the radiation receptacle and the detector receptacle on a vertical support bar which may be provided above or below the conduit for the material to be measured. This support bar may be adapted for lateral movement on a horizontally disposed rolling track.

The movability of the measuring radiometric measuring device thus permits the device to be moved out of the measuring position, in case repairs or other work is necessary on the duct 2.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for automatically monitoring a flow of fine-grained solid fuels and dust-like solid fuels which are suspended in a gaseous carrier medium through a conduit, comprising:

determining a specific weight $\rho_K$ of the fuel;

determining a density $\rho_{N2}$ of the gaseous carrier medium;

determining a total density $\rho_{tot}$ of the fuel and gaseous carrier medium together;

determining a flow volume $V_{N2}$ of the gaseous carrier medium;

computing a flowing mass $M_K$ of the fuel according to an equation in which $$M_K = V_{N2} \cdot \rho_K (\rho_{N2} - \rho_{tot})/(\rho_{tot} - \rho_K);$$

generating a control signal representing $M_K$; and controlling the flow in the conduit in accordance with the control signal.

2. The process defined by claim 1, wherein the control signal is electrical.

3. The process defined by claim 1, wherein the control signal is pneumatic.

* * * * *